(12) United States Patent
Kanamaru et al.

(10) Patent No.: US 10,647,361 B2
(45) Date of Patent: May 12, 2020

(54) VEHICLE WITH HIGH-STRENGTH FRAME MEMBERS

(71) Applicant: MAZDA MOTOR CORPORATION, Hiroshima (JP)

(72) Inventors: Daisuke Kanamaru, Hatsukaichi (JP); Hiroto Kido, Aki-gun (JP); Yasushi Ishikawa, Hiroshima (JP); Atsushi Kawamoto, Hiroshima (JP); Yuuki Uchiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/103,673

(22) Filed: Aug. 14, 2018

(65) Prior Publication Data

US 2019/0061823 A1 Feb. 28, 2019

(30) Foreign Application Priority Data

Aug. 23, 2017 (JP) .................................. 2017-159887

(51) Int. Cl.
*B62D 21/15* (2006.01)
*B62D 25/08* (2006.01)
(Continued)

(52) U.S. Cl.
CPC .......... *B62D 21/152* (2013.01); *B62D 21/03* (2013.01); *B62D 21/11* (2013.01); *B62D 25/082* (2013.01); *B62D 25/085* (2013.01)

(58) Field of Classification Search
CPC .. B62D 21/152; B62D 25/082; B62D 21/155; B62D 25/08; B62D 21/11; B62D 25/04; B62D 25/025
(Continued)

(56) References Cited

U.S. PATENT DOCUMENTS

| 2015/0329144 A1* | 11/2015 | Hara ..................... B62D 21/152 |
| | | 296/187.09 |
| 2015/0375793 A1* | 12/2015 | Donabedian ........... B62D 21/02 |
| | | 296/187.09 |

(Continued)

FOREIGN PATENT DOCUMENTS

| JP | 2012-214211 A | 11/2012 |
| JP | 2014-080091 A | 5/2014 |

(Continued)

*Primary Examiner* — D Glenn Dayoan
*Assistant Examiner* — Sunsurraye Westbrook
(74) *Attorney, Agent, or Firm* — Studebaker & Brackett PC

(57) ABSTRACT

A frame (extension frame) extending in a vehicle longitudinal direction on an outward side, in a vehicle width direction, of a powertrain mounted at a front portion of a vehicle includes front-side and rear-side high strength portions which are spaced apart, in the vehicle longitudinal direction, from each other and a low strength portion which is positioned, in the vehicle longitudinal direction, between the both high strength portions. The low strength portion has a lower bending strength than each of the both high strength portions. A specified portion which is a part of the low strength portion is positioned on the outward side, in the vehicle width direction, of and in front of a part of the powertrain (oil pan) which is located at the same level as the specified portion of the frame.

8 Claims, 7 Drawing Sheets

(51) Int. Cl.
*B62D 21/03* (2006.01)
*B62D 21/11* (2006.01)

(58) Field of Classification Search
USPC .... 296/187.09, 193.09, 204, 193.06, 193.11, 296/96.21, 207, 193.07, 193.05
See application file for complete search history.

(56) References Cited

U.S. PATENT DOCUMENTS

| | | | |
|---|---|---|---|
| 2016/0107695 A1* | 4/2016 | Lee | B62D 25/082 296/187.09 |
| 2016/0152273 A1* | 6/2016 | Kuriyama | B62D 21/152 296/187.09 |
| 2016/0375938 A1* | 12/2016 | Matsuo | B62D 21/11 296/204 |

FOREIGN PATENT DOCUMENTS

| | | |
|---|---|---|
| JP | 2016-037242 A | 3/2016 |
| JP | 2017-030579 A | 2/2017 |

* cited by examiner

VEHICLE WITH HIGH-STRENGTH FRAME MEMBERS

BACKGROUND OF THE INVENTION

The present invention relates to a vehicle which comprises a powertrain mounted at a front portion of the vehicle and a frame provided to extend in a vehicle longitudinal direction on an outward side, in a vehicle width direction, of the powertrain.

Conventionally, it is known that a collision load which is generated in a vehicle frontal collision is absorbed through deformation of a frame (a front side frame or an extension frame extending forward from a suspension cross member). Further, there is a case where a vehicle collides with an obstacle at a position which is offset outward, in the vehicle width direction, from the front side frame as a manner of the vehicle frontal collision, which is called a small overlap collision. Herein, it is also known that a load-reception portion which is configured to protrude outward, in the vehicle width direction, from a front end portion of the front side frame is provided in order to cope with this small overlap collision (see Japanese Patent Laid-Open publication No. 2012-214211, for example). This patent document discloses a structure in which the front side frame is moved in the vehicle width direction and also a power unit (powertrain) is moved in the vehicle width direction by the collision load inputted to the above-described load reception portion, so that collision energy is absorbed and a vehicle front portion is suppressed from retreating toward a cabin.

In the structure disclosed in the above-described patent document, however, there is a possibility that a mount device to support the powertrain at the front side frame is destroyed by an inertia force of the powertrain in a case where the collision load generated in the small overlap collision is large. If the mount device is destroyed by the inertia force of the powertrain, the powertrain is moved forward by its inertia force. There is a concern that this forward move of the powertrain may cause a situation where a fuel pipe which is coupled to an engine of the powertrain via a connector is detached from the connector, for example.

SUMMARY OF THE INVENTION

The present invention has been devised in view of the above-described matter, and an object of the present invention is to properly suppress the above-described forward move of the powertrain in the vehicle small overlap collision.

The present invention is a vehicle which comprises a powertrain mounted at a front portion of the vehicle, and a frame provided to extend in a vehicle longitudinal direction on an outward side, in a vehicle width direction, of the powertrain, wherein the frame includes a front-side high strength portion and a rear-side high strength portion which are spaced apart, in the vehicle longitudinal direction, from each other and a low strength portion which is positioned, in the vehicle longitudinal direction, between the front-side high strength portion and the rear-side high strength portion, the low strength portion being configured to have a lower bending strength than each of the front-side and rear-side high strength portions, and a specified portion of the frame which is at least a part of the low strength portion, in the vehicle longitudinal direction, of the frame is positioned on the outward side, in the vehicle width direction, of and in front of a part of the powertrain which is located at the same level as the specified portion of the frame.

According to the present invention, since the specified portion (a portion of the low strength portion which is positioned closely to the front-side high strength portion, in particular) which is a part of the low strength portion of the frame (a front side frame or an extension frame extending forward from a suspension cross member) is positioned on the outward side, in the vehicle width direction, of and in front of the powertrain, this specified portion is easily bent inward in the vehicle width direction when the collision load is applied from the outward side, in the vehicle width direction, of the vehicle in the small overlap collision. Then, this bent specified portion comes to contact the powertrain, so that the powertrain can be suppressed from being moved forward.

In an embodiment of the present invention, the low strength portion is formed by a part of the frame which is configured to be curved inward in the vehicle width direction.

According to this embodiment, the specified portion of the low strength portion (the portion of the low strength portion which is positioned closely to the front-side high strength portion, in particular) is more easily bent inward in the vehicle width direction.

In another embodiment of the present invention, a load-reception portion is provided at a front end portion of the frame, the load-reception portion being configured to protrude outward, in the vehicle width direction, from the front end portion of the frame and receive a collision load in a vehicle frontal collision on the outward side, in the vehicle width direction, of the frame.

According to this embodiment, since the collision load inputted to the load-reception portion is directly applied to the frame from the outward side, in the vehicle width direction, of the vehicle in the small overlap collision, the inward bending, in the vehicle width direction, of the specified portion of the low strength portion can be promoted. Accordingly, the powertrain can be effectively suppressed from being moved forward in the small overlap collision.

In another embodiment of the present invention, the load-reception portion is formed by a plate member joined to the frame, and the front-side high strength portion of the frame is formed by a joint portion of the frame where the plate member is joined.

According to this embodiment, the front-side high strength portion can be formed simply, and since a pressing force is applied to the front-side high strength portion so as to press the front-side high strength portion inward in the vehicle width direction in the small overlap collision, a portion which is positioned closely to and in back of the front-side high strength portion, i.e., the portion of the low strength portion which is positioned closely to the front-side high strength portion, can be bent inward in the vehicle width direction.

In another embodiment of the present invention, the frame is an extension frame which is provided to extend forward from a suspension cross member which extends in the vehicle width direction and supports a front-wheel suspension, and the rear-side high strength portion of the frame is formed by a structure in which a rear end portion of the extension frame is joined to the suspension cross member in a state where the rear end portion of the extension frame overlaps the suspension cross member in the vehicle longitudinal direction.

According to this embodiment, the rear-side high strength portion can be formed simply.

In another embodiment of the present invention, the powertrain comprises an engine, and the part of the powertrain located at the same level as the specified portion of the frame is an oil pan of the engine which is provided at a lower-side part of the engine.

According to this embodiment, since the inward-bent specified portion contacts the oil pan of the engine in the small overlap collision, the powertrain can be effectively suppressed from being moved forward.

Other features, aspects, and advantages of the present invention will become apparent from the following description which refers to the accompanying drawings.

DETAILED DESCRIPTION OF THE INVENTION

Figure 1:
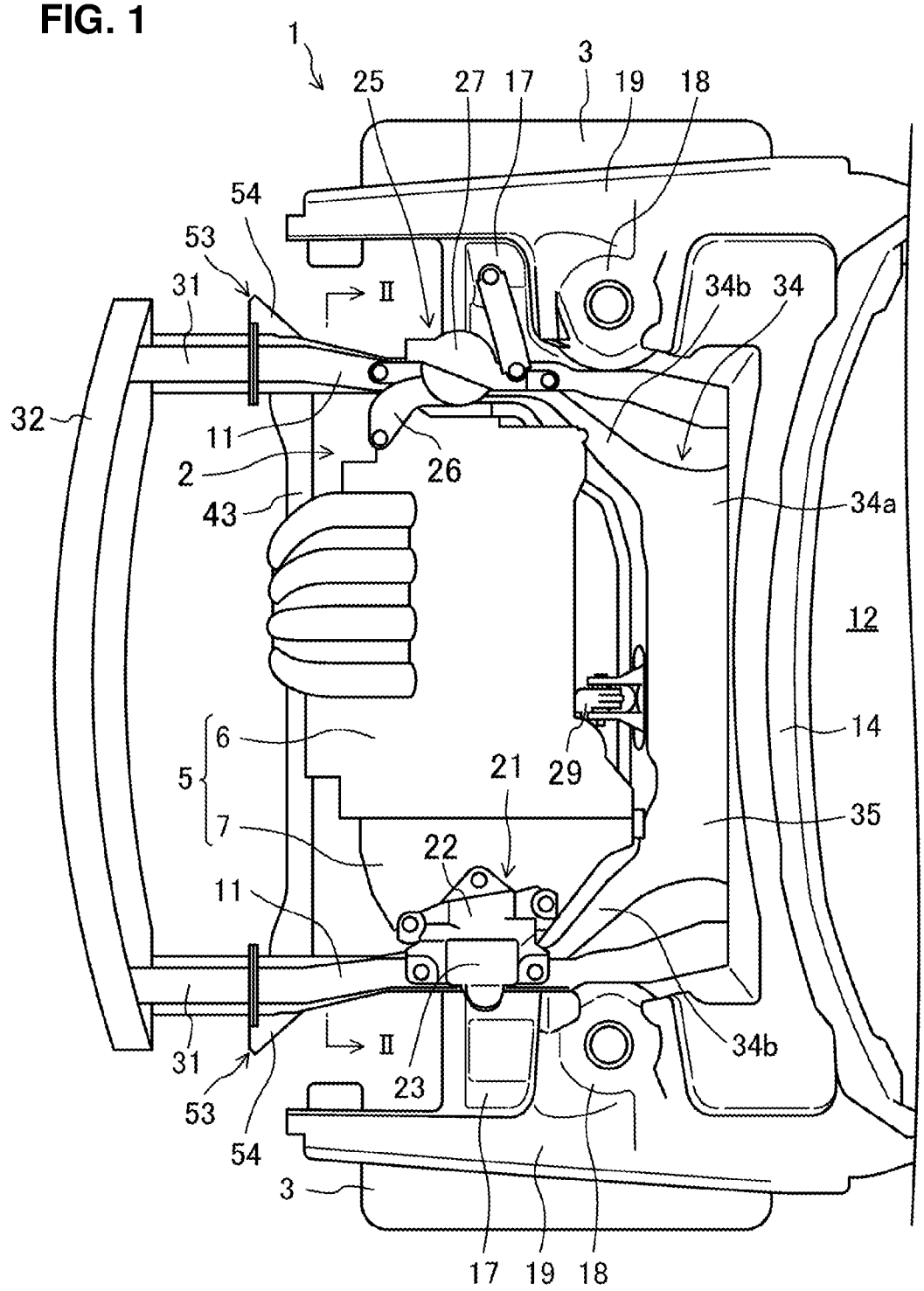
FIG. 1 is a plan view showing a major part of a front portion of a vehicle to which a vehicle-body structure according to an embodiment of the present invention is applied.

Hereafter, an embodiment of the present invention will be described specifically referring to the drawings. A powertrain 5 to drive right-and-left front wheels 3 of a vehicle 1 is arranged in an engine room 2 provided at a front portion of the vehicle 1. The powertrain 5 comprises an engine 6 and a transmission 7 where a torque (driving force) generated by the engine 6 is inputted. Hereafter, the directional terms of "forward," "rearward," "leftward," "rightward," "upward," and "downward" with respect to the vehicle 1 are simply referred to as "forward," "rearward," "leftward," "rightward," "upward," and "downward."

The engine 6 and the transmission 7 are aligned in the vehicle width direction (lateral direction) between a pair of right-and-left front side frames 11, which will be described later. In the present embodiment, the engine 6 is positioned on the right side of the transmission 7.

Figure 2:
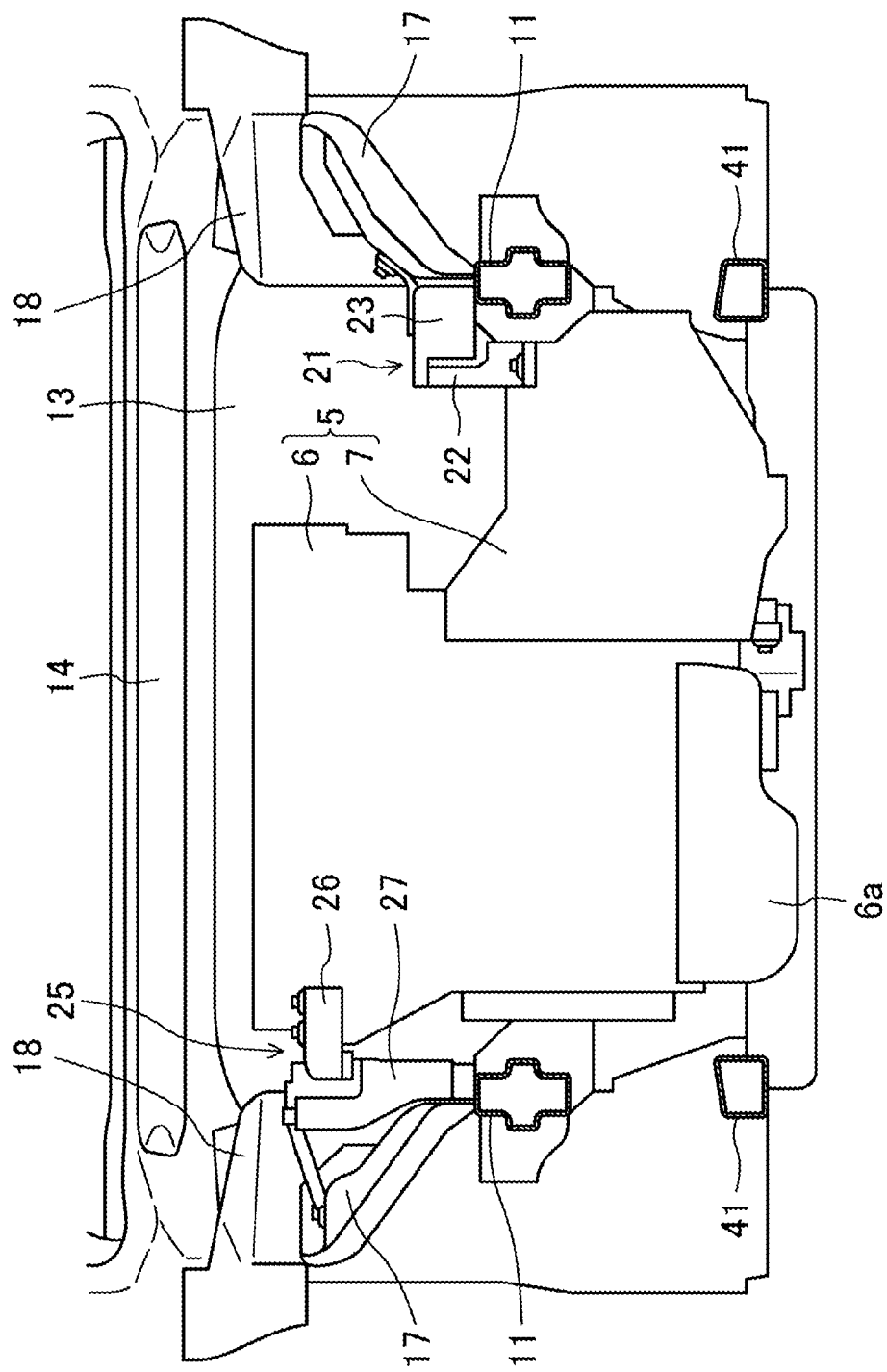
FIG. 2 is a sectional view taken along line II-II of FIG. 1.

A pair of right-and-left front side frames 11 which respectively have a roughly rectangular-shaped closed cross section extending in a longitudinal direction are arranged at both-side end portions, in the vehicle width direction, of the engine room 2. Further, a dash panel 13 (see FIG. 2) which partitions a cabin 12 from the engine room 2 is provided at a rear end portion of the engine room 2. A cowl member 14 is joined to an upper end portion of the dash panel 13. Respective rear end portions of right-and-left apron reinforcement members 19 are connected to both-side end portions, in the vehicle width direction, of the cowl member 14.

A wheel house panel 17 and a suspension tower 18 are provided on the outward side, in the vehicle width direction, of the front side frame 11. The wheel house panel 17 is configured in an arc shape to cover over the front wheel 3, and forms a front wheel house in its arc shape. A lower end portion of the suspension tower 18 is fixed to the front side frame 11, and an upper end portion of the suspension tower 18 is fixed to the apron member 19.

The powertrain 5 is resiliently supported at the right-and-left front side frames 11 at its both end portions via a right-side mount device 25 and a left-side mount device 21 such that a longitudinal direction of the powertrain 5 matches the vehicle width direction. The left-side mount device 21 comprises a powertrain-side connecting member 22 which is connected to an upper part of a left-side end portion of the transmission 7, a vehicle-body-side connecting member 23 which is connected to the left-side front side frame 11 and the left-side wheel house panel 17, and a rubber bush (not illustrated) which is arranged between the both connecting members 22, 23. The upper part of the left-side end portion of the transmission 7 is resiliently supported at the left-side front side frame 11 by the left-side mount device 21. Further, the right-side mount device 25 comprises a powertrain-side connecting member 26 which is connected to an upper part of a right-side end portion of the engine 6, a vehicle-body-side connecting member 27 which is connected to the right-side front side frame 11 and the right-side wheel house panel 17, and a rubber bush (not illustrated) which is arranged between the both connecting members 26, 27. The upper part of the right-side end portion of the engine 6 is resiliently supported at the right-side front side frame 11 by the right-side mount device 25.

Crash cans 31 are provided at respective front end faces of the right-and-left front side frames 11, and front end faces of the right-and-left crash cans 31 are fixed to right-and-left both end portions of a bumper beam 32 extending in the vehicle width direction.

Figure 3:
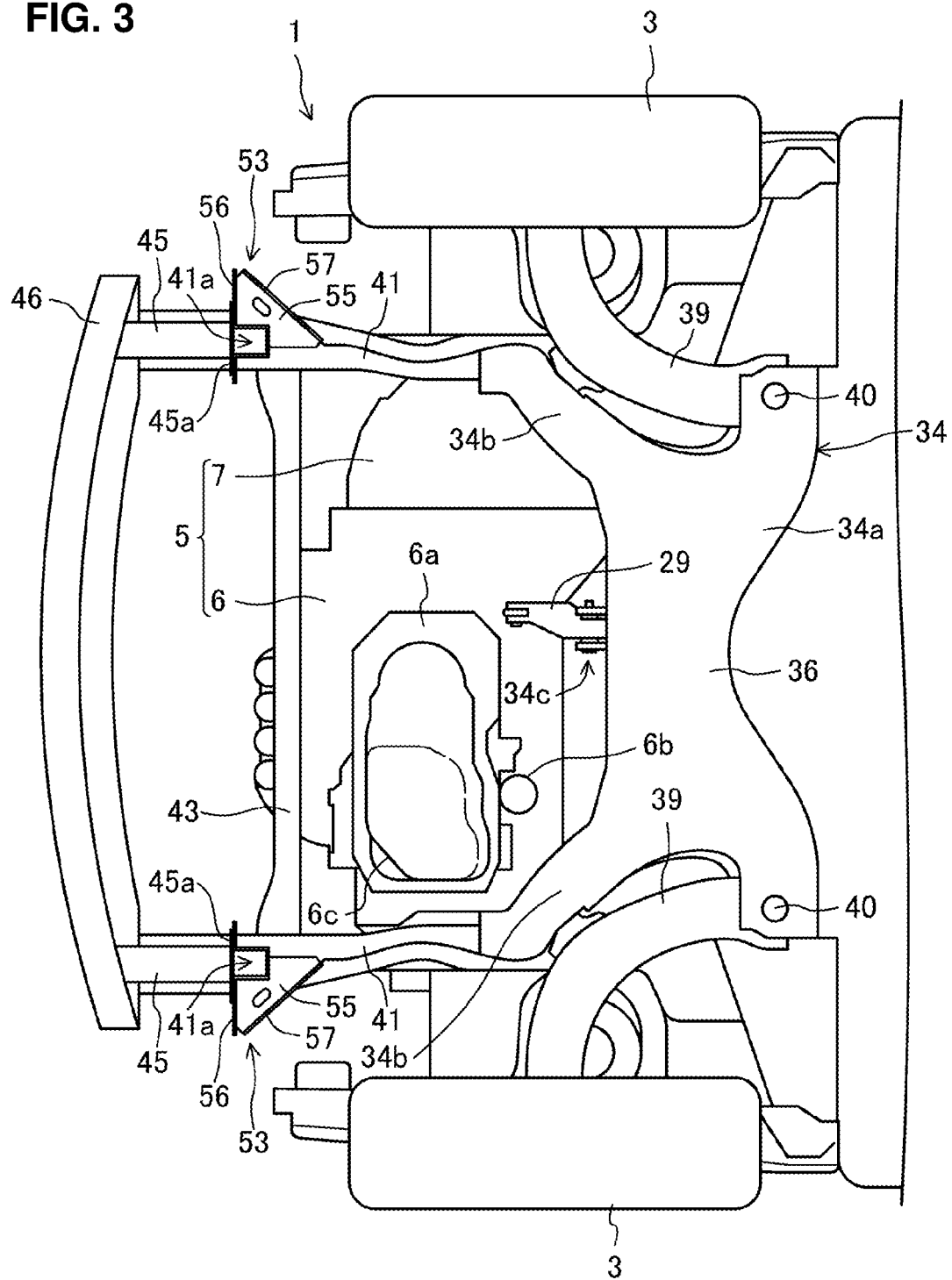
FIG. 3 is a bottom view of the front portion of the vehicle, when viewed from a downward side of the vehicle.
Figure 4:
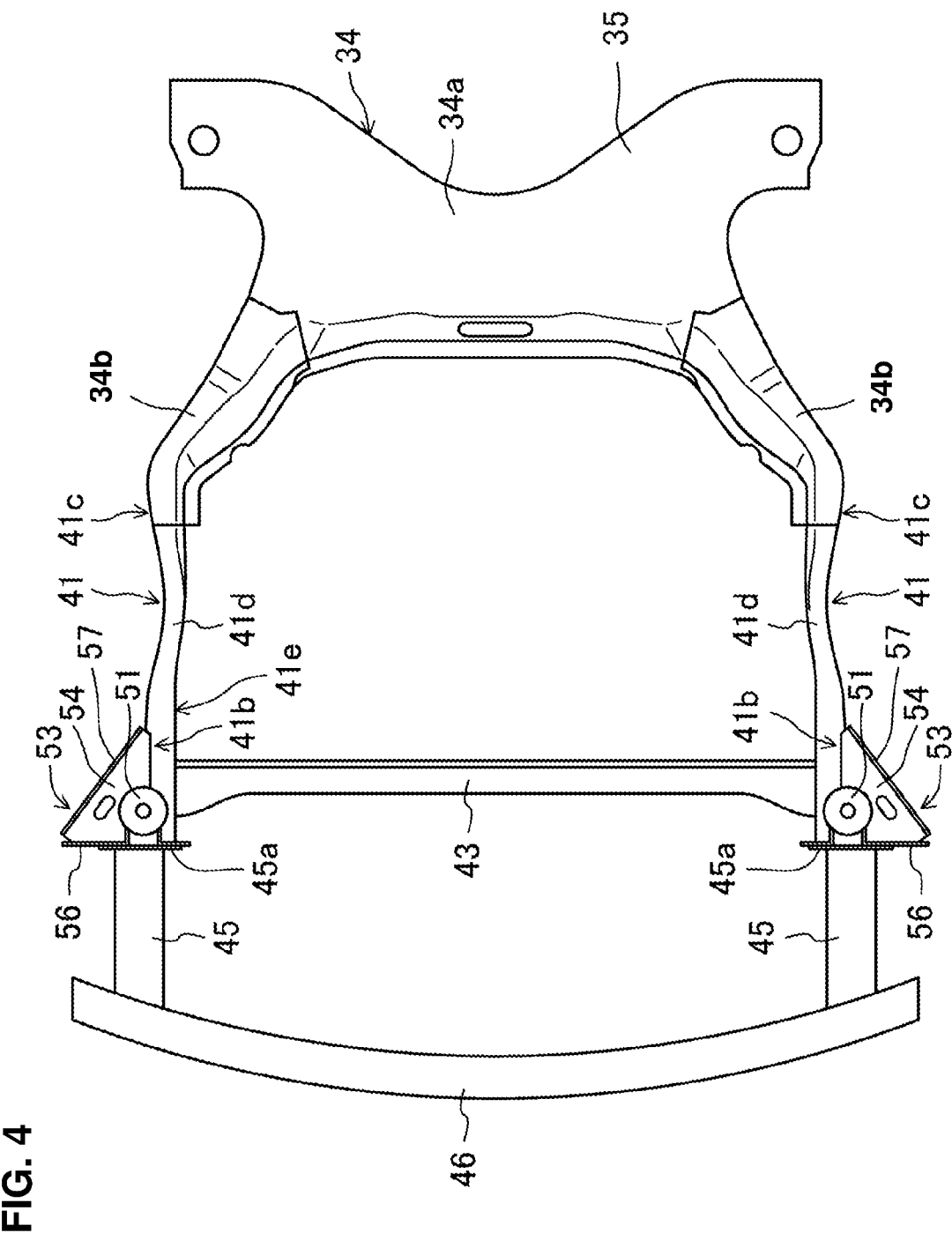
FIG. 4 is a plan view showing a body portion and right-and-left forward extension portions of a suspension cross member, right-and-left extension frames, a connecting cross member, crash cans, and stiffeners.

As shown in FIGS. 3 and 4, a suspension cross member 34 which extends in the vehicle width direction below the right-and-left front side frames 11 is provided slightly in back of the suspension towers 18. The suspension cross member 34 comprises an upper-side member 35 and a lower-side member 36 which are joined together at their peripheral portions.

The suspension cross member 34 comprises a body portion 34a which extends in the vehicle width direction and forward extension portions 34b which extend obliquely forward and outward from respective front edges of right-and-left both end portions of the body portion 34a. Each of the right-and-left forward extension portions 34b is configured to have a roughly rectangular-shaped closed cross section which is formed by the upper-side member 35 and the lower-side member 36.

The right-and-left front wheels 3 are supported at the body portion 34a of the suspension cross member 34 via right-and-left suspension arms 39 (lower arms) which constitute a part of a front suspension. Each of the right-and-left front wheels 3 is supported at one end (outward end portion in the vehicle width direction) of the suspension arm 39, and the other end (inward end portion in the vehicle width direction) of the suspension arm 39 is supported by an axis 40 (see FIGS. 3, 6 and 7) which extends in a vertical direction at an end portion of a rear-side part of the body portion 34a via a rubber bush. Further, a middle part, in a longitudinal direction, of the suspension arm 39 is supported at the forward extension portion 34b by a longitudinally-extending axis via a rubber bush.

An upward extension portion (not illustrated) which extends upward is provided at an upper face of each of the right-and-left forward extension portions 34b, and an upper end part of this upward extension portion is fixed to a lower face of the front side frame 11.

A torque-rod support portion 34c which rotatably supports a torque rod 29 around an axis extending in the vehicle width direction is provided in the vicinity of a central part, in the vehicle width direction, of the body portion 34a of the suspension cross member 34. The torque rod 29 is provided at a part of a lower face of the engine 6 which is positioned near the transmission 7. While the above-described resilient supporting of the powertrain 5 at its both end portions by the right-and-left mount devices 21, 24 causes a rotation (a swing) of the powertrain 5 around an axis extending in the vehicle width direction, the above-described torque rod 29 restricts an over-rotation (excessive-rotation) of the powertrain 5 around the above-described axis.

To front end portions of the right-and-left forward extension portions 34b are respectively joined extension frames 41 which extend in the longitudinal direction below the right-and-left front side frames 11 and have a roughly rectangular-shaped closed cross section. The right-and-left extension frames 41 are located substantially at the same position, in the vehicle width direction, as the right-and-left front side frames 11. A rear end portion of each of the extension frames 41 is joined to the forward extension portion 34b (the upper-side member 35 and the lower-side member 36) in a state where it is inserted into the closed cross section of the forward extension portion 34b. That is, the rear end portion of the extension frame 41 is joined such that it overlaps the suspension cross member 34 in the longitudinal direction.

A crash can 45 is provided at a front end face of each of the extension frames 41, which is similar to the crash can 31 provided at the front end of each of the front side frames 11. Respective front end faces of the right-and-rear crash cans 45 are fixed to right-and-left both end portions of a stiffener 46 which extends in the vehicle width direction below the bumper beam 32. This stiffener 46 serves as a leg sweeping member which is configured to contact a lower part of a leg portion of a pedestrian and sweep the leg portion in a vehicle frontal collision. Thereby, the pedestrian is made to fall down onto a bonnet (engine hood) of the vehicle 1, whereby the pedestrian can be properly suppressed from having some damage, such as a broken leg. Herein, respective front-side parts of the bumper beam 32 and the stiffener 46 are covered with a front bumper 48 (see FIGS. 6 and 7). The front bumper 48 is configured to extend outward, in the vehicle width direction, beyond the bumper beam 32 and the stiffener 46.

Figure 5:
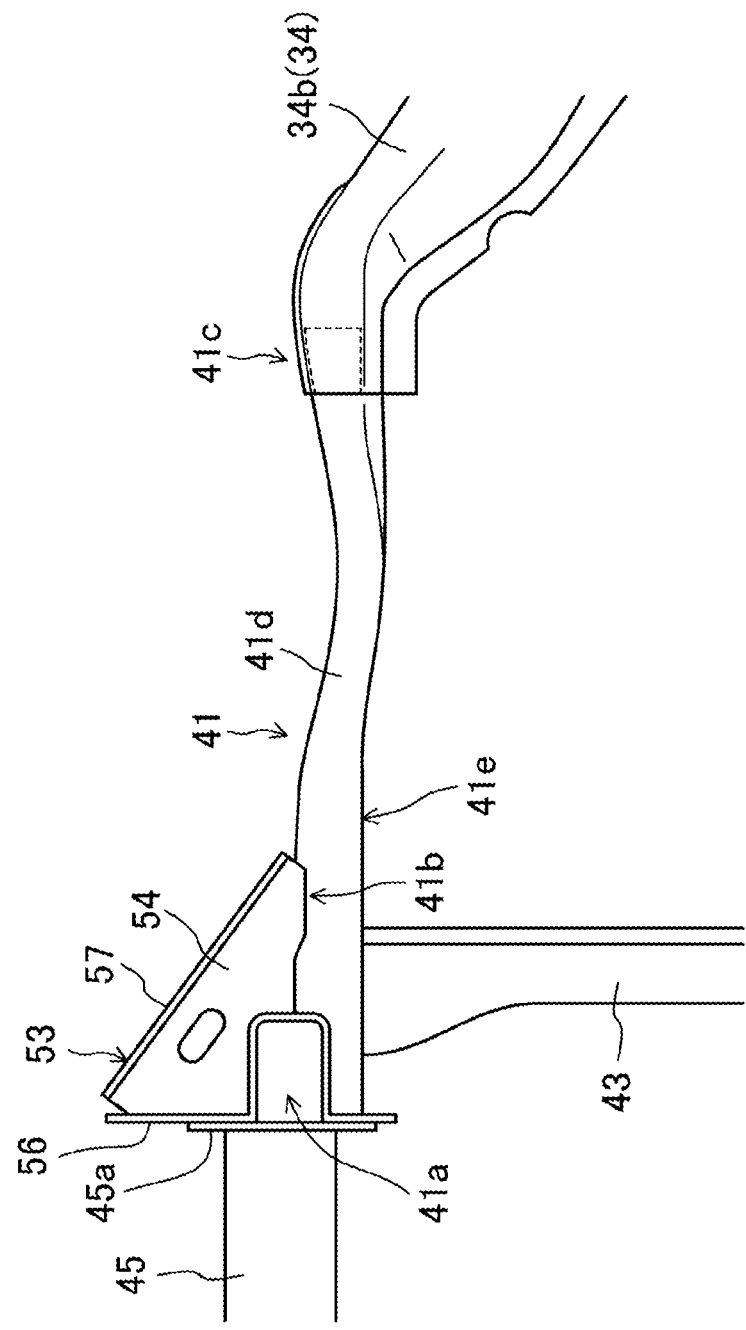
FIG. 5 is an enlarged plan view showing the right-side extension frame.

As shown in FIG. 5, a recess portion 41a which is recessed rearward is formed at the front end face of each of the extension frames 41 over an entire area in the vertical direction. This recess portion 41a is made for lightweight of the extension frame 41.

Respective front end portions of the right-and-left extension frames 41 are interconnected by a connecting member 43 extending in the vehicle width direction. The body portion 34a and the right-and-left forward extension portions 34b of the suspension cross member 34, the right-and-left extension frames 41, and the connecting member 43 constitute a perimeter frame which is of a roughly rectangular shape in the plan view.

A lower end face of a connecting member 51 which extends in the vertical direction (see FIG. 4 (not illustrated in FIG. 5)) is fixed to an upper face of the front end portion of each of the extension frames 41, and an upper end face of the connecting member 51 is fixed to a lower face of the front side frame 11.

A load-reception portion 53 is provided at the front end portion of each of the extension frames 41. This load-reception portion 53 is configured to protrude outward, in the vehicle width direction, from the front end portion of the extension frame 41 and receive a collision load in the frontal collision of the vehicle 1 at a position located on the outward side, in the vehicle width direction, of the extension frame 41 (i.e., on the outward side, in the vehicle width direction, of the front side frame 11). That is, when an obstacle 71 (see FIGS. 6 and 7) collides with a part of a front face of the vehicle 1 (the front bumper 48, in particular) which is positioned on the outward side, in the vehicle width direction, of the extension frame 41, i.e., in the small overlap collision, the collision load is inputted to the load-reception portion 53 by way of the front bumper 48.

As shown in FIG. 5, the load-reception portion 53 comprises an upper face member 54 which is made of a plate member and joined to an upper face of the front end portion of the extension frame 41 and a lower face member 55 (see FIG. 3) which is made of a plate member and joined to a lower face of the front end portion of the extension frame 41 such that it faces the upper face member 54. The upper face member 54 and the lower face member 55 are respectively of a roughly rectangular shape, in the plan view, having the same size, and each of these members 54, 55 comprises a front-side edge which extends outward straightly from a portion of the upper face of the extension frame 41 which is positioned on the outward side, in the vehicle width direction, of the recess portion 41a and a rear-side edge which extends obliquely rearward and inward from a tip of the front-side edge. The respective front-side edges of the upper face member 54 and the lower face member 55 are connected by a front face member 56 which is made of a plate member, and the respective rear-side edges of these members 54, 55 are connected by a rear face member 57 which is made of a plate member. The front face member 56 extends, along a side face and a bottom face of the recess portion 41a, up to a position located inward, in the vehicle width direction, relative to the recess portion 41a, and is connected to a flange plate 45a which is provided at a rear face of the crash can 45.

The extension frame 41 includes a front-side and rear-side high strength portions 41b, 41c which are spaced apart, in the vehicle longitudinal direction, from each other and a low strength portion 41d which is positioned, in the vehicle longitudinal direction, between the front-side and rear-side high strength portions 41b, 41c. The low strength portion 41d is configured to have a lower bending strength than each of the front-side and rear-side high strength portions 41b, 41c.

In the present embodiment, a joint portion of the upper face member 54 and the lower face member 55 of the extension frame 41 (the front end portion of the extension frame 41) constitutes the front-side high strength portion 41b. Further, the rear end portion of the extension frame 41 is joined to the suspension cross member 34 such that it overlaps the suspension cross member 34 in the longitudinal direction, which constitutes a rear-side high strength portion 41c.

While the low strength portion 41d is formed by a part of the extension frame 41 which is configured to be curved inward in the vehicle width direction in the present invention, it may be formed by a part of the extension frame 41 which is configured to extend straightly.

In the present embodiment, the right-side extension frame 41 corresponds to the frame of the present invention, and when the small overlap collision happens at a right-side part of the front face of the vehicle 1, the right-side extension frame 41 is bent as described later, so that the powertrain 5 is suppressed from being moved forward. When the small overlap collision happens at a left-side part of the front face of the vehicle 1, the left-side extension frame 41 is bent similarly to the above-described bending of the right-side extension frame 41. Herein, the powertrain 5 is suppressed from being moved forward by another means (not specifically described here) than the left-side extension frame 41 in the present embodiment.

The right-side extension frame 41 extends in the longitudinal direction on the outward side (right side), in the vehicle width direction, of the powertrain 5 (engine 6). An oil pan 6a (see FIGS. 2, 3, 6 and 7) of the engine 6 of the powertrain 5 is provided at the same level as the right-side extension frame 41. The oil pan 6a is made of metal. Herein, reference character 6b denotes a metal case of an oil filter in FIGS. 3, 6 and 7.

Figure 6:
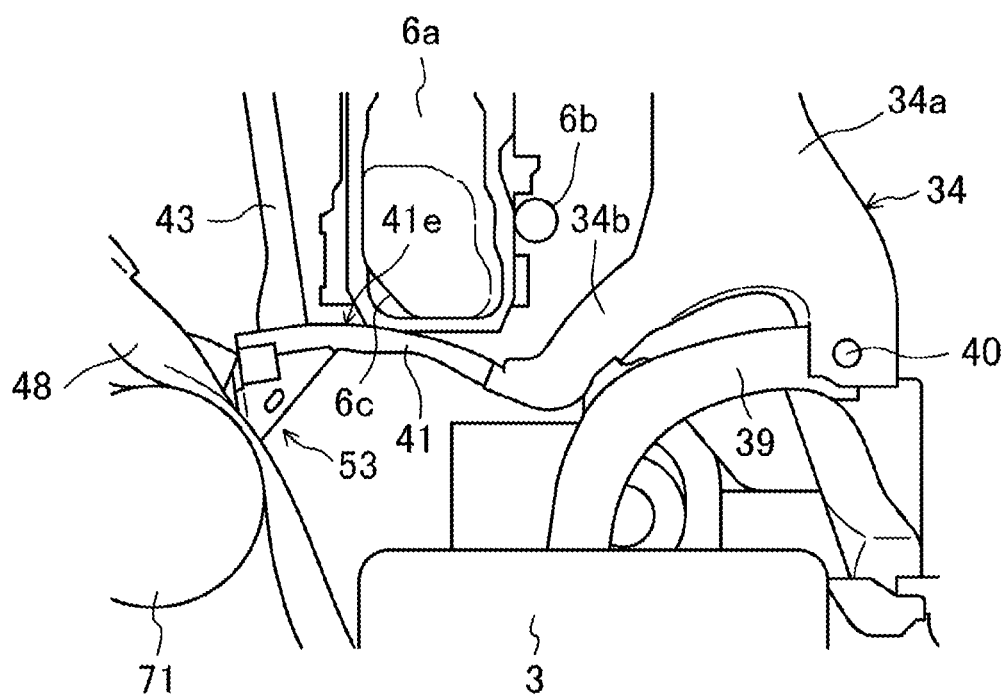
FIG. 6 is a bottom view schematically showing a manner of deformation of a low strength portion of the right-side extension frame in a case where a small overlap collision of a right-side part of a front face of the vehicle with an obstacle happens.
Figure 7:
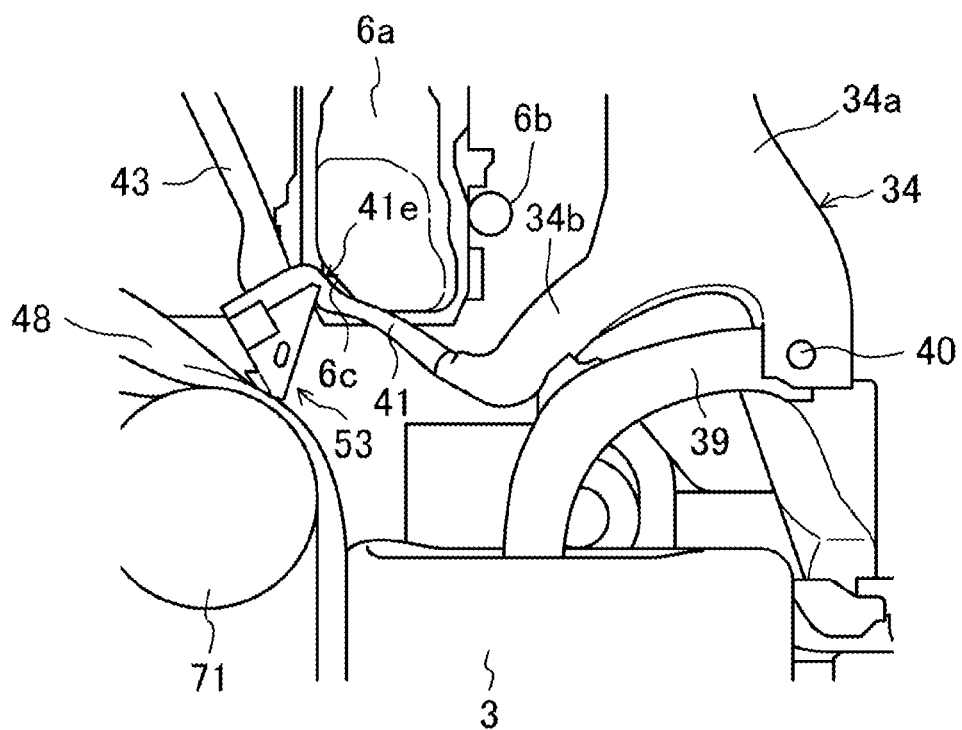
FIG. 7 is a bottom view corresponding to FIG. 6, which shows a manner of the deformation in a state where the obstacle further retreats from a state shown in FIG. 6.

In the present embodiment, a part of the low strength portion 41d of the right-side extension frame 41 which is positioned in the vicinity of the front-side high strength portion 41b is set as a specified portion 41e. This specified portion 41e is positioned on the outward side, in the vehicle width direction, of and in front of the part of the powertrain 5 (i.e., the oil pan 6a) which is located at the same level as the specified portion 41e. As shown in FIGS. 3, 6 and 7, a front-and-right side corner of a lower part of the oil pan 6a is chamfered, and a slant face 6c which is configured to slant forward and inward is formed at this corner. This slant face 6c forms a contact portion where the specified portion 41e which is bent and curved as described later contacts.

When the small overlap collision of the right-side part of the front face of the vehicle with the obstacle 71 happens, the collision load is inputted to the load-reception portion 53 of the right-side extension frame 41 by way of the front bumper 48. Thereby, a pressing force is applied to the front-side high strength portion 41b of the right-side extension frame 41 so as to press the front-side high strength portion 41 inward in the vehicle width direction. The specified portion 41e of the low strength portion 41d of the right-side extension frame 41 is bent inward in the vehicle width direction by the above-described pressing force as shown in FIG. 6.

When the obstacle 71 retreats further relative to the vehicle 1, as shown in FIG. 7, bending of the specified portion 41e progresses and the specified portion 41e protrudes inward greatly, so that the specified portion 41e contacts the above-described contact portion (the slant face 6c). Consequently, even if the right-side mount device 25 is destroyed by the inertia force of the powertrain 5 so as to allow the powertrain 5 (the engine 6) to be moved forward, this forward move of the powertrain 5 is suppressed properly. Herein, while the specified portion 41e contacts only a rear end part of the slant face 6c in FIG. 7, it may contract substantially an entire part of the slant face 6c according to a collision state.

Thus, according to the present embodiment, when the small collision of the right-side part of the front face of the vehicle 1 with the obstacle 71 happens, the specified portion 41e of the right-side extension frame 41 is bent and contacts the above-described contact portion (the slant face 6c of the oil pan 6a), so that the forward move of the powertrain 5 can be suppressed. Consequently, a problem that a fuel pipe (not illustrated) which is coupled to the engine 6 via a connector is detached from this connector, for example, can be prevented.

The present invention should not be limited to the above-described embodiment and any other modifications or improvements may be applied within the scope of a spirit of the present invention.

For example, while the oil pan 6a of the above-described embodiment is made of metal, in a case where it is made of resin, the metal case of the oil filter 6b may be arranged at an appropriate position and this metal case may be set as the contact portion where the specified portion 41e contacts. In this case, after the resin-made oil pan 6a has got broken through its contacting with the specified portion, the specified portion 41e comes to contact the above-described metal case.

Further, while the present embodiment is configured such that the right-side extension frame 41 corresponds to the frame of the present invention, the left-side extension frame 41 may correspond to the frame of the present invention in place of or in addition to the right-side extension frame 41. In this case, the contact portion where the specified portion 41e of the low strength portion 41d of the left-side extension frame 41 contacts is provided at a lower portion of the transmission 7.

Moreover, while the present embodiment is configured such that the front end portion of the extension frame 41 is set as the front-side high strength portion 41b and the rear end portion of the extension frame 41 is set as the rear-side high strength portion 41c, the front-side and rear-side high strength portions 41b, 41c may be provided to be spaced from each other in the longitudinal direction of the extension frame 41. However, it is necessary that the specified portion 41e of the low strength portion 41d is positioned in front of the powertrain 5. For example, the front end portion of the extension frame 41 may be set as the front-side high strength portion 41b and an entire part, in the longitudinal direction, of the low strength portion 41d may be set as the specified portion 41e. In this case, the rear-side high strength portion 41c is located substantially at the same position, in the longitudinal direction, as the portion of the powertrain 5 which is located at the same level as the specified portion 41e.

Additionally, the right-and-left front side frames 11 may be set as the frame of the present invention in place of the extension frame.

What is claimed is:
1. A vehicle, comprising:
a powertrain mounted at a front portion of the vehicle; and
a first frame provided to extend in a vehicle longitudinal direction on a first outward side, in a vehicle width direction, of the powertrain,
wherein said first frame includes a front-side high strength portion and a rear-side high strength portion which are spaced apart, in the vehicle longitudinal direction, from each other and a low strength portion which is positioned, in the vehicle longitudinal direction, between said front-side high strength portion and said rear-side high strength portion, the low strength portion being configured to have a lower bending strength in the vehicle width direction than each of the front-side and rear-side high strength portions,
a specified portion of said first frame which is at least a part of said low strength portion, in the vehicle longitudinal direction, of the first frame is positioned on the outward side, in the vehicle width direction, of and in front of a part of said powertrain which is located at the same level as said specified portion of the first frame, a load-reception portion is provided at a front end portion of said first frame, the load-reception portion being configured to protrude outward, in the vehicle width direction, from the front end portion of the first frame and receive a collision load in a vehicle frontal collision on the outward side, in the vehicle width direction, of the first frame, and a rear-most end of the front side high strength portion is positioned forward of the specified portion with respect to the vehicle longitudinal direction.

2. The vehicle of claim 1, wherein said low strength portion is formed by a part of said first frame which is configured to be curved inward in the vehicle width direction.

3. The vehicle of claim 1, wherein said load-reception portion is formed by further comprising a plate member joined to said first frame, and said front-side high strength portion of the first frame is formed by a joint portion of the first frame where said plate member is joined.

4. The vehicle of claim 1, wherein said first frame is an extension frame which is provided to extend forward from a suspension cross member which extends in the vehicle width direction and supports a front-wheel suspension, and said front-side high strength portion of the first frame is formed by a structure in which a rear end portion of said extension frame is joined to said suspension cross member in a state where the rear end portion of the extension frame overlaps the suspension cross member in the vehicle longitudinal direction.

5. The vehicle of claim 1, wherein said powertrain comprises an engine, and said part of the powertrain located at the same level as the specified portion of the first frame is an oil pan of the engine which is provided at a lower-side part of the engine.

6. The vehicle of claim 1, further comprising:
a second frame extending in the vehicle longitudinal direction on a second outward side of the vehicle in the vehicle width direction,
a connecting member joined to the front portion of the first frame and a front portion of the second frame, the connecting member forming a part of the front-side high strength portion.

7. A vehicle, comprising:
a powertrain mounted at a front portion of the vehicle;
a suspension cross member provided to extend in a vehicle width direction and support a front-wheel suspension; and
an extension frame provided to extend forward, in a vehicle longitudinal direction, from the suspension cross member on an outward side, in the vehicle width direction, of the powertrain,
wherein said extension frame includes a front-side high strength portion and a rear-side high strength portion which are spaced apart, in the vehicle longitudinal direction, from each other and a low strength portion which is positioned, in the vehicle longitudinal direction, between said front-side high strength portion and said rear-side high strength portion, the low strength portion being configured to have a lower bending strength than each of the front-side and rear-side high strength portions,
a specified portion of said extension frame which is at least a part of said low strength portion, in the vehicle longitudinal direction, of the extension frame is positioned on the outward side, in the vehicle width direction, of and in front of a part of said powertrain which is located at the same level as said specified portion of the extension frame,
said low strength portion is formed by a part of said extension frame which is configured to be curved inward in the vehicle width direction,
a load-reception portion is provided at a front end portion of said extension frame, the load-reception portion being configured to protrude outward, in the vehicle width direction, from the front end portion of the extension frame and receive a collision load in a vehicle frontal collision on the outward side, in the vehicle width direction, of the extension frame, and
said front-side high strength portion of the extension frame is formed by a structure in which a rear end portion of said extension frame is joined to said suspension cross member in a state where the rear end portion of the extension frame overlaps the suspension cross member in the vehicle longitudinal direction.

8. The vehicle of claim 7, wherein said load-reception portion is formed by a plate member joined to said frame, and said front-side high strength portion of the frame is formed by a joint portion of the frame where said plate member is joined.

* * * * *